Patented Jan. 1, 1924.

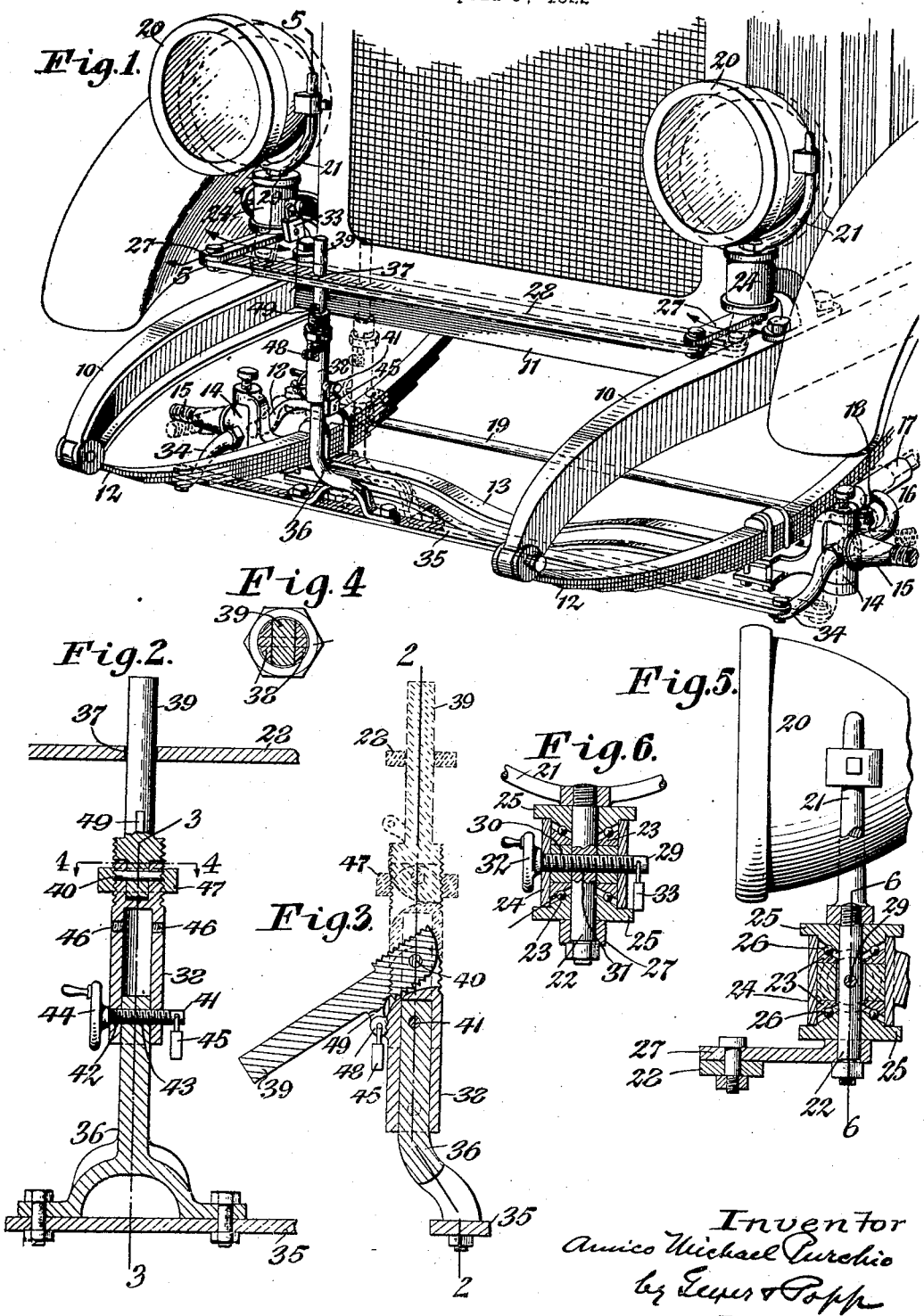

1,479,435

UNITED STATES PATENT OFFICE.

AMICO MICHAEL PURCHIO, OF BUFFALO, NEW YORK.

LAMP-OPERATING MECHANISM FOR AUTOMOBILES.

Application filed April 3, 1922. Serial No. 548,996.

*To all whom it may concern:*

Be it known that I, AMICO MICHAEL PURCHIO, a citizen of the United States, residing in Buffalo, in the county of Erie and State of New York, have invented new and useful Improvements in Lamp-Operating Mechanism for Automobiles, of which the following is a specification.

This invention relates to a lamp operating mechanism for automobiles in which the lamps supporting brackets are operatively connected with the steering gear or mechanism of the automobile so that when turning the automobile either toward the right or the left of a straight course, the lamps will be correspondingly turned and thus properly illuminate the roadway ahead of the automobile in accordance with the course which is taken.

One of the objects of this invention is to provide an operating mechanism of this character which permits of uncoupling the lamp supporting mechanism with the steering mechanism during the day time when the lamps are not required and thus avoid unnecessary wear upon the supports of the lamps.

Another object of this invention is to provide means for locking the coupling between the steering mechanism and the lamp operating mechanism when these parts are coupled and in an operative position and also to permit of disconnecting the steering mechanism from the lamp mechanism when desired.

A further object is to provide simple and efficient means for locking the lamp mechanism in position so that the same can not be turned during the day time and also prevent operation of the steering mechanism of the car when the last-mentioned mechanism is coupled with the lamps, thereby preventing normal operation of the car and guarding against theft of the same.

In the accompanying drawings:

Figure 1 is a fragmentary perspective view of an automobile equipped with my improved lamp operating mechanism. Figure 2 is a vertical transverse section of the means for coupling the steering mechanism with the lamp mechanism and also locking the coupling mechanism either in its operative or inoperative position, this section being taken on line 2—2, Fig. 3. Figure 3 is a fragmentary vertical section taken on line 3—3, Fig. 2. Figure 4 is a horizontal section, taken on line 4—4, Fig. 2. Figure 5 is a fragmentary vertical section, taken on line 5—5, Fig. 1. Figure 6 is a vertical section, taken on line 6—6, Fig. 5.

Similar characters of reference refer to like parts throughout the several views.

In its general organization the automobile which is shown in the drawings for illustrating the application of my invention comprises a main frame having two side bars 10, 10 connected by a cross bar 11, two springs 12 arranged underneath the front parts of the side bars 10 and operatively connected therewith, a front axle 13 arranged transversely underneath the springs and connected therewith in any suitable manner, and steering knuckles forming part of the steering mechanism of the car and having upright hubs 14 which are pivoted vertically on opposite ends of the front axle 13 and are provided with outwardly projecting axle arms 15 upon which the steering wheels are journaled, a rearwardly projecting steering arm 16 arranged on one of the hubs 14 and connected by means of a rod 17 with the steering wheel, near the driver's seat, and two shifting arms 18, 18, projecting rearwardly from the hubs 14 and connected by transverse rods 19, so as to cause the steering knuckles to turn in unison.

Arranged above the front parts of the side bars are two lamps or head lights 20 of any suitable construction, each of which is mounted on the upper part of the bracket 21, the lower part of which is provided with a downwardly projecting vertical spindle 22 which is journaled in a bearing mounted on the upper part of the adjacent frame bar 10, each of these bearings in its preferred form consisting of upper and lower cones 23 arranged on the upper and lower parts of a bracket 24 which is mounted on the adjacent frame bar 10, upper and lower cones 25 mounted on the respective bracket spindle 22 and bearing rollers 26 interposed between the cones 23 of the frame bracket and the cones of the lamp bracket, as shown in Figs. 5 and 6.

By this means each of the brackets is capable of turning about a vertical axis on the main frame and thereby direct the light of the lamp when the same is lighted in different angular directions forwardly of the car.

For the purpose of causing both of these lamps to turn in unison, the lower ends of the spindles 22 of both lamp brackets are provided with forwardly projecting bracket arms 27, the front ends of which are connected pivotally with opposite ends of an upper shifting bar 28 arranged horizontally and transversely above the main frame.

If it is desired to hold the lamp brackets against turning, this may be accomplished by a locking device which in its preferred construction, as shown in Figs. 1, 5 and 6, comprises a locking pin 29 which is preferably externally screw threaded and adapted to pass through corresponding openings 30, 31, in the bracket bearings and the spindle, a hand wheel 32 arranged in one end of this locking pin and a pad lock 33 detachably connected with the opposite end of this locking pin. Such a locking device is associated with the bearing and spindle of only one of the lamp brackets, inasmuch as the locking of one lamp against turning will serve to lock both of them owing to the means which operatively connect both of these lamp brackets.

Means are provided for causing the lamp brackets to turn in unison with the steering mechanism of the automobile which means in their preferred form are so organized that the steering mechanism and the lamp shifting mechanism may be either connected or disconnected so that the lamps may be automatically turned in a horizontal way during the night time when the lamps are lighted but permits the lamps to remain at rest during the day time when the same are extinguished.

This coupling mechanism between the steering mechanism and the lamp shifting mechanism in its preferred form is constructed as follows:

Projecting forwardly from the hubs 14 of the knuckles are two knuckles arms 34, the front ends of which are pivotally connected with each other, by means of a horizontal transverse lower shifting bar 35. Projecting upwardly from the central part of this lower shifting bar 35 is a standard 36 and above this standard the upper shifting bar 28 is provided with a locking opening 37. 38 and 39 represent the lower and upper sections of a coupling rod which are pivotally connected with each other at their opposing ends by means of a pin 40, so that these two rod sections may be folded one relatively to the other. The lower coupling rod section 38 is preferably mounted on the upper part of the bracket 36 so as to be capable of sliding vertically thereon in the manner of a telescopic joint. For this purpose the rod section 38 is made in the form of a tube or sleeve and slides lengthwise upon the circular upper part of the bracket 36.

The upper section 39 of the coupling rod when in its elevated position and in line with the lower section 38 is adapted to engage with the opening 37 of the upper shifting rod 28 and thus produce an operative connection between the lower shifting bar 35 and the upper shifting bar 28 so that the movement of the steering mechanism of the car is transmitted to the lamp brackets and cause the lamps or head lights 20 to be turned horizontally in unison with the steering wheels of the car. By this means the beams of light which are directed forwardly from the lamps are shifted either toward one side or the other of the road whenever the automobile is steered for changing the course from a straight line, and thus securing an illumination of the roadway ahead of the car in accordance with the path which the car intends to take.

The coupling rod is held in its elevated position in engagement with lamp shifting bar 28 by means which are so constructed that they also serve as a lock which means in their preferred form consists of a locking pin 41 passing through corresponding openings 42, 43 in the lower coupling rod section 38 and the adjacent part of the standard 36 and a lug 44 arranged at one end of this pin and a pad lock 45 detachably connected with the other end of this pin, as best shown in Fig. 2. This pin is preferably threaded externally and the openings 42 and 43 in the rod section 38 and standard 36 are correspondingly threaded for the purpose of obtaining a more reliable connection between these parts. Upon lowering the coupling rod sections 38 and 39 upon the standard 36 so as to disengage the upper rod section 39 from the opening 37 into the upper shifting rod, then the lamp shifting mechanism will not be effected by the operation of the steering mechanism. When the parts are thus shifted the locking pin 41 may be passed through openings 46 in the upper part of the lower rod section 38 and also through the opening 43 in the standard 36 for the purpose of holding the coupling rod in its inoperative position. While the upper coupling rod section 39 is not engaged with the opening 37 in the upper shifting rod 28 the latter and the lower shifting bar 35 are free to move vertically relatively to each other during the variation of the position of the front axle and springs relatively to the main frame, inasmuch as the coupling rod section 39 is free to slide in the bar 28 and still compel the bar 28 and bar 35 to move horizontally together.

An suitable means may be provided for holding the lower and upper coupling rod sections 38 and 39 rigidly relatively to each other, while the same are employed for coupling the bars 35 and 28. The means which are shown in the drawings for accomplishing this purpose are satisfactory and consist of a screw nut 47 adapted to engage with a screw thread formed externally on the opposing end portions of the lower and upper coupling rod sections 38 and 39 adjacent to the pivot pin 40. Upon turning this screw nut 47 upwardly so that the same is wholly mounted on the upper section 39 on the coupling rod, the same after being moved vertically out of engagement from the opening 37, may be swung downwardly into an angular position relative to the lower rod section 38, as shown by full lines in Fig. 3, in which position the same is not liable to interfere with the free vertical movement of the lower and upper shifting bars 35 and 28 relative to each other. When the upper shifting rod section 39 is thus turned downwardly the same is preferably held against rattling by utilizing the padlock 45 which may be passed through corresponding lugs 48, 49 formed on adjacent parts of the rod sections 38 and 39, as shown in Fig. 3. When the upper coupling rod section 39 is raised into vertical alignment with the lower rod section 38, the screw nut 47 may be screwed downwardly, so as to engage the threaded upper part of the lower rod section 38 and also the threaded lower part of the upper rod section 39 which is arranged below the pivot pin 40, as shown by full lines in Fig. 2 and by dotted lines in Fig. 3, in which position of this screw nut the same holds the lower and upper coupling rod sections perfectly rigid relatively to each other and ensures transmission of the movement of the lower shifting bar 35 to the upper bar 28 so that the lamps or head lights are turned horizontally in unison with the steering mechanism.

If it is desired to utilize this lamp operating mechanism for the purpose of guarding against theft of the automobile, the locking pin 29 may be passed through the bearing and spindle of one of the lamp brackets and held in place thereon by means of the lock 33 and at the same time the coupling rod sections 38 and 39 may be locked in their elevated position by means of the pad lock 45 so that a connection is established between the lower and upper shifting rods 35 and 28, thereby preventing the steering mechanism of the automobile from being actuated and thus preventing operation of the automobile in a normal manner which will serve as a deterent against stealing the same.

This invention therefore permits of turning the lamps at night in unison with the steering mechanism for ensuring greater safety in traffic during the night time while permitting disconnection of these parts during the day time when the lamps are not required, also serving as a deterent against stealing the car. The means whereby these ends are accomplished are comparatively simple in construction, low in cost and capable of being applied to the standard types of automobiles now in general use.

I claim as my invention:

1. A lamp operating mechanism for automobiles comprising a main frame, lamp brackets pivoted on the main frame, steering knuckles pivoted on the main frame, and means for connecting and disconnecting said steering knuckles and lamp brackets comprising bracket arms arranged on said brackets, knuckle arms arranged on said knuckles, an upper bar connecting said bracket arms and provided with an opening a lower bar connecting said knuckle arms, a standard mounted on said lower bar, a coupling rod composed of upper and lower pivotally connecting sections, said upper section being adapted to engage with said opening and said lower section being slidable vertically on said standard, and a screw nut arranged on said coupling rod and adapted to move lengthwise thereof for locking the same against folding or permitting the same to fold.

2. A lamp operating mechanism for automobiles comprising a main frame, lamp brackets pivoted on the main frame, steering knuckles pivoted on the main frame, and means for connecting and disconnecting said steering knuckles and lamp brackets comprising bracket arm arranged on said brackets, knuckle arms arranged on said knuckles, an upper bar connecting said bracket arms and provided with an opening a lower bar connecting said knuckle arms, a standard mounted on said lower bar, a coupling rod composed of upper and lower pivotally connected sections, said upper section being adapted to engage with said opening and said lower section being slidable vertically on said standard, a screw nut arranged on said coupling rod and adapted to move lengthwise thereof for locking the same against folding or permitting the same to fold, and means for securing said coupling bar on said standard either in a position in which this rod engages with said opening or in a position in which the same is disengaged therefrom.

3. A lamp operating mechanism for automobiles comprising a frame provided with a bearing, a lamp bracket provided with a spindle journaled in said bearing, a steering mechanism operatively connected with said spindle, means for positively holding said spindle against turning consisting of a locking pin passing through the bearing and spindle, and a lock for preventing detachment of said locking pin from said bearing and spindle.

4. A lamp operating mechanism for automobiles comprising a main frame, lamp brackets pivoted on said frame, a steering mechanism having knuckles pivoted on said frame, locking means for preventing said lamp brackets from turning, means for coupling said steering mechanism and lamp brackets, and locking means for holding said coupling means in an operative position.

AMICO MICHAEL PURCHIO.